(12) United States Patent
Simpson et al.

(10) Patent No.: US 11,965,461 B2
(45) Date of Patent: Apr. 23, 2024

(54) INLET AIR MANAGEMENT SYSTEM

(71) Applicant: Bell Textron Inc., Fort Worth, TX (US)

(72) Inventors: Daniel John Simpson, Arlington, TX (US); Tim Nobel, Fort Worth, TX (US); Mitchell Jay Griffith, Hurst, TX (US); Henry Rodger Bredenkamp, Jr., Granbury, TX (US); Dave H. Loe, Hurst, TX (US); Paul Park, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 16/846,377

(22) Filed: Apr. 12, 2020

(65) Prior Publication Data

US 2021/0317783 A1    Oct. 14, 2021

(51) Int. Cl.
| | |
|---|---|
| *F02C 7/057* | (2006.01) |
| *B64D 29/00* | (2006.01) |
| *B64D 33/02* | (2006.01) |
| *F02C 7/05* | (2006.01) |

(52) U.S. Cl.
CPC .............. *F02C 7/057* (2013.01); *B64D 29/00* (2013.01); *B64D 33/02* (2013.01); *F02C 7/05* (2013.01); *B64D 2033/0246* (2013.01)

(58) Field of Classification Search
CPC ...... B64D 2033/022; B64D 2033/0246; B64D 2033/0253; B64D 41/007; B64D 2241/00; F02C 7/052; F02C 7/057; F02C 7/04; F02C 7/42; F02C 7/05; B64C 27/52
See application file for complete search history.

(56) References Cited

U.S. PATENT DOCUMENTS

| | | | | |
|---|---|---|---|---|
| 2,374,412 | A * | 4/1945 | Caldwell | B64D 33/02 55/306 |
| 6,598,384 | B1 * | 7/2003 | Adkins | F02C 7/055 55/306 |
| 9,517,842 | B2 | 12/2016 | Brand | |
| 10,023,296 | B2 * | 7/2018 | Miller | B64C 27/14 |
| 11,359,544 | B2 * | 6/2022 | O'Brien | F02C 7/055 |
| 2011/0001003 | A1 * | 1/2011 | Krahl | B64D 33/02 244/58 |
| 2014/0158833 | A1 * | 6/2014 | Braeutigam | B64D 33/02 244/53 B |
| 2015/0344141 | A1 * | 12/2015 | Brand | F02C 7/055 55/306 |
| 2017/0241342 | A1 * | 8/2017 | Gekht | F02C 7/04 |

(Continued)

FOREIGN PATENT DOCUMENTS

| | | | | |
|---|---|---|---|---|
| CA | 2978695 | A1 * | 4/2018 | ............ B64D 33/02 |
| EP | 2224100 | A2 * | 9/2010 | ............ F02C 7/057 |
| KR | 101842800 | B1 * | 3/2018 | |

*Primary Examiner* — Joshua J Michener
*Assistant Examiner* — Ryan Andrew Yankey
(74) *Attorney, Agent, or Firm* — Lightfoot & Alford PLLC

(57) ABSTRACT

A rotatable nacelle includes an engine inlet configured to receive air and an inlet air management system (IAMS). The IAMS includes a primary inlet configured to selectively allow air to flow into a duct associated with the engine air inlet via the primary inlet and a secondary inlet configured to selectively allow air to flow into the duct associated with the engine air inlet via the secondary inlet. The secondary inlet is configured to receive an air filter.

15 Claims, 11 Drawing Sheets

(56) References Cited

U.S. PATENT DOCUMENTS

2018/0043986 A1* 2/2018 Miller .................. B64C 27/14
2018/0208323 A1* 7/2018 Parsons ................ B64D 33/02
2022/0356841 A1* 11/2022 Bacon .................. F02C 7/057

* cited by examiner

INLET AIR MANAGEMENT SYSTEM

BACKGROUND

Some aircraft comprise engine inlet barrier filters. One purpose of an engine inlet barrier filter is to prevent particulate matter from passing through an engine inlet and into an engine intake, such as preventing kicked up sand from entering an engine while landing on unprepared surfaces. However, while the rotorcraft is in a sufficiently clean air environment, such as high above the ground in forward flight, engine inlet barrier filters are not needed for safe operation. In some cases, energy can be conserved and/or improved flight performance can be achieved by bypassing the engine inlet barrier filters when they are not needed. Similarly, for tiltrotor aircraft where an orientation of the engine inlet is changed between operation in a hover mode and a fast forward flight mode, management of excess air during fast forward flight modes is problematic. Accordingly, there remains a need for improved aircraft engine inlet air management.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
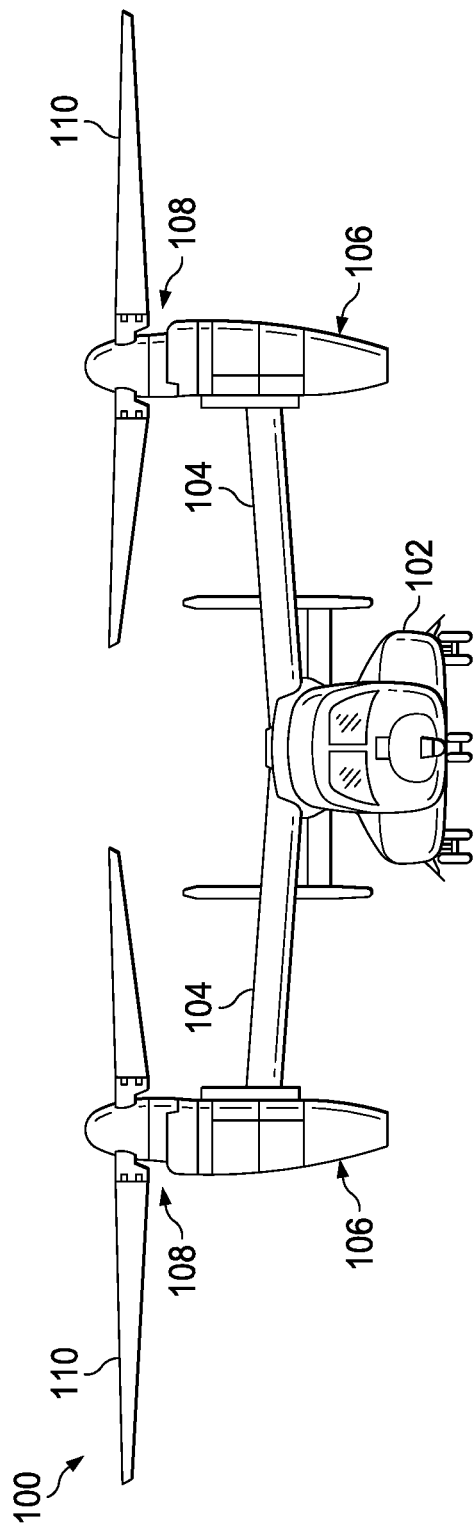
FIG. 1 is a front view of a tiltrotor aircraft comprising an inlet air management system (IAMS) according to this disclosure, with the tiltrotor aircraft in a helicopter mode.
Figure 2:
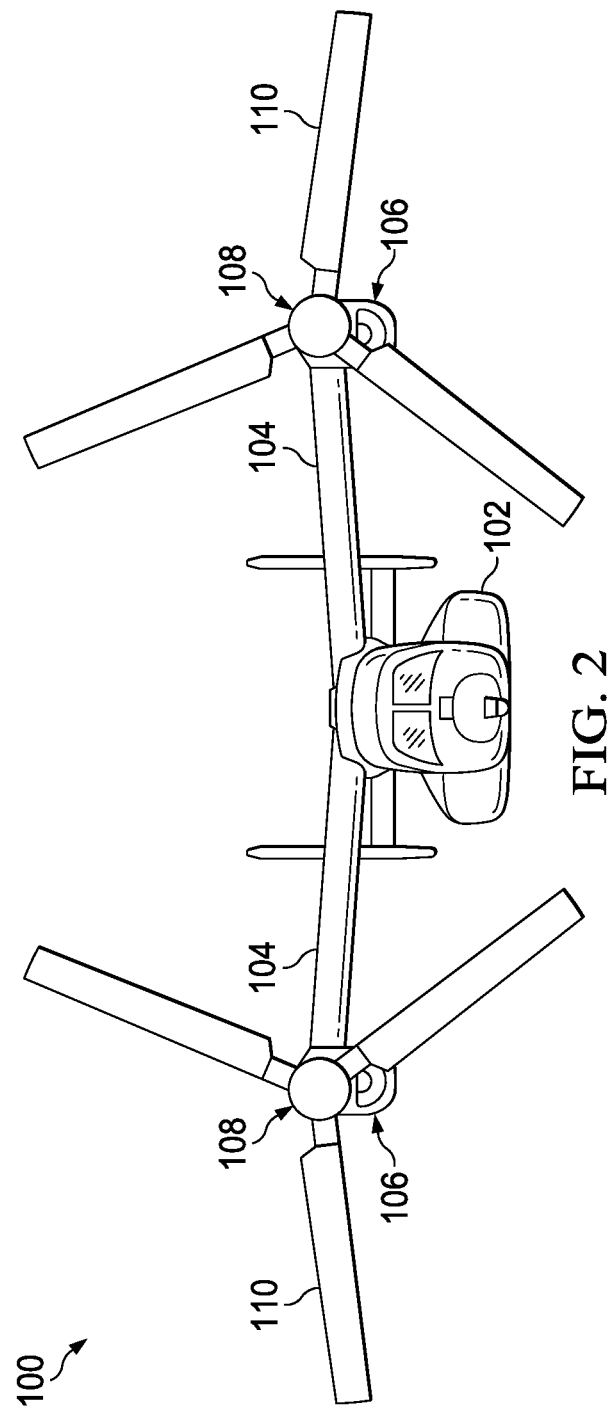
FIG. 2 is a front view of the tiltrotor aircraft of FIG. 1, with the tiltrotor aircraft in an airplane mode.

Referring to FIG. 1, a tiltrotor aircraft 100 is illustrated. Tiltrotor aircraft 100 may include a fuselage 102 with a fixed wing 104 extending therefrom. At each end of fixed wing 104 there is a rotatable nacelle 106 housing a powerplant for driving an attached proprotor 108 in rotation, each proprotor 108 a plurality of blades 110 extending therefrom. The position of proprotors 108, as well as the pitch of blades 110, can be selectively controlled to selectively control direction, thrust, and lift of tiltrotor aircraft 100. FIG. 1 illustrates tiltrotor aircraft 100 in helicopter mode, in which proprotors 108 are positioned substantially vertical to provide a lifting thrust. FIG. 2 illustrates the tiltrotor aircraft 100 in airplane mode, in which proprotors 108 are positioned substantially horizontally to provide a primarily forward thrust. Each nacelle 106 of tiltrotor aircraft 100 further comprises an inlet air management system (IAMS) 200 configured to selectively operate in a filtered mode, an unfiltered mode, and/or a partially filtered mode. Further, the IAMS 200 are configured to switch between the filtered mode, the unfiltered mode, and/or the partially filtered mode during flight of the tiltrotor aircraft 100 while operated in the helicopter mode, the airplane mode, and/or an intermediate or transition mode in which the proprotors 108 are positioned between the above-described vertical and horizontal positions.

Figure 3:
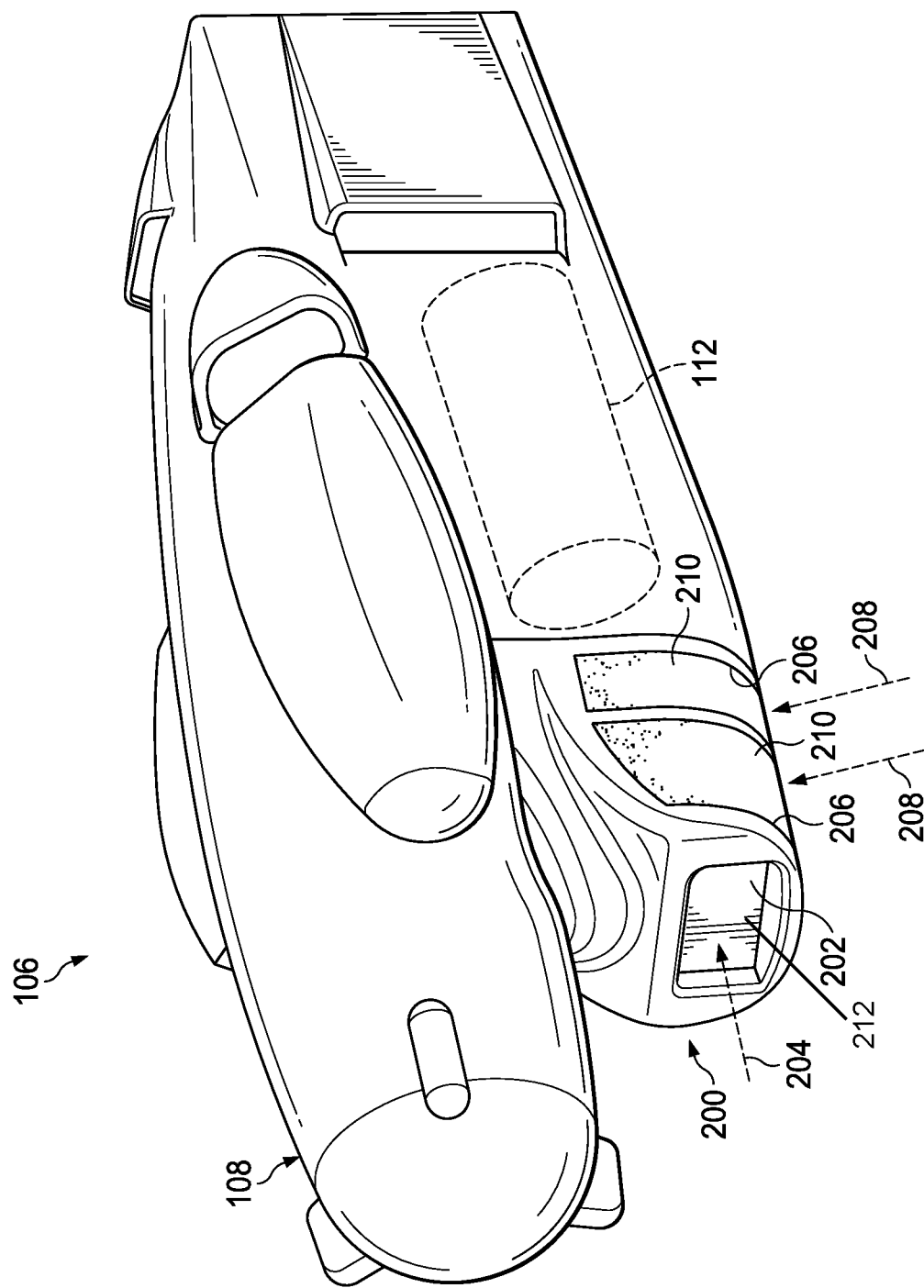
FIG. 3 is an oblique view of a nacelle of the tiltrotor aircraft of FIG. 1, the nacelle comprising an IAMS according to this disclosure.

Referring now to FIG. 3, a nacelle 106 is shown in isolation. IAMS 200 is carried by the nacelle 106 and, with regard to airflow provided to an engine 112, is located upstream relative to the engine 112. Most generally, the IAMS 200 is configured to selectively cause air to flow either through a primary inlet 202 along primary flowpath 204 or through a secondary inlet 206 along a secondary flowpath 208, both of which will be explained in greater detail below. Under normal operating circumstances, air is taken into the IAMS 200 along the unfiltered primary flowpath 204 while the tiltrotor aircraft 100 is flying in an airplane mode or fast forward flight mode. When the tiltrotor aircraft 100 is flying in a helicopter mode or hover mode, air is taken into the IAMS 200 along the filtered secondary flowpath 208. In some embodiments or use cases, air may be taken through one or both of the flowpaths 204, 208 and fed to the engine 112, regardless of the mode in which the tiltrotor aircraft 100 is operating. Air passing through secondary inlet 206 along the secondary flowpath 208 is filtered by filters 210. As shown in FIG. 3, an inlet door 212 is shown in a closed position so that inlet door 212 blocks air from flowing into the IAMS 200 via the primary inlet 202 and therefore forces air to enter the IAMS 200 via the secondary inlet 206 and through the filters 210.

Figure 4:
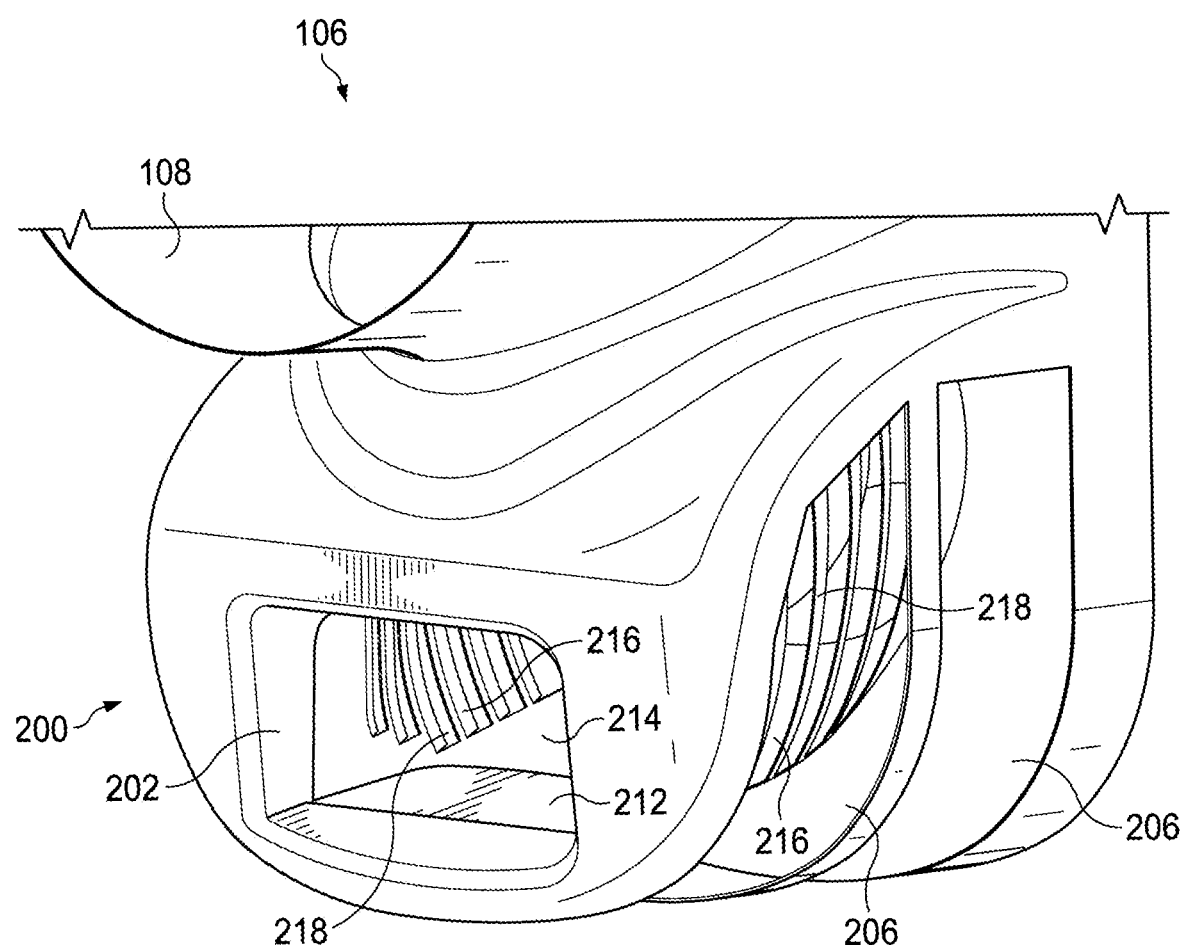
FIG. 4 is a partial oblique view of the nacelle of FIG. 3.
Figure 5:
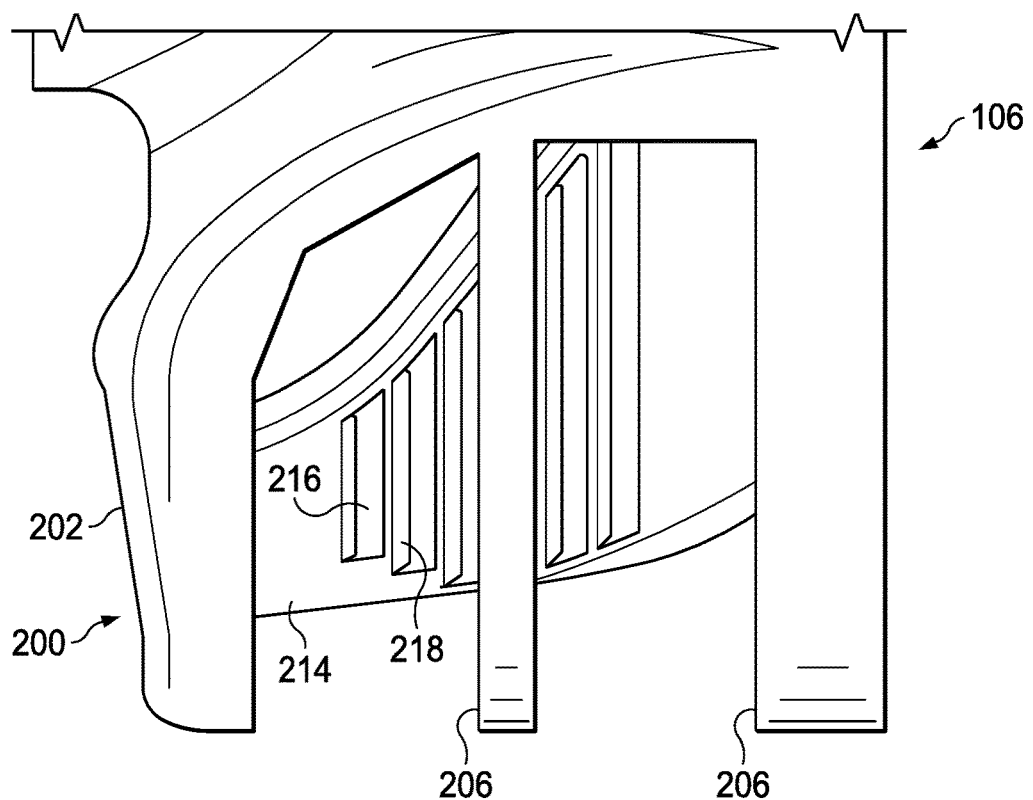
FIG. 5 is a partial side view of the nacelle of FIG. 3.
Figure 6:
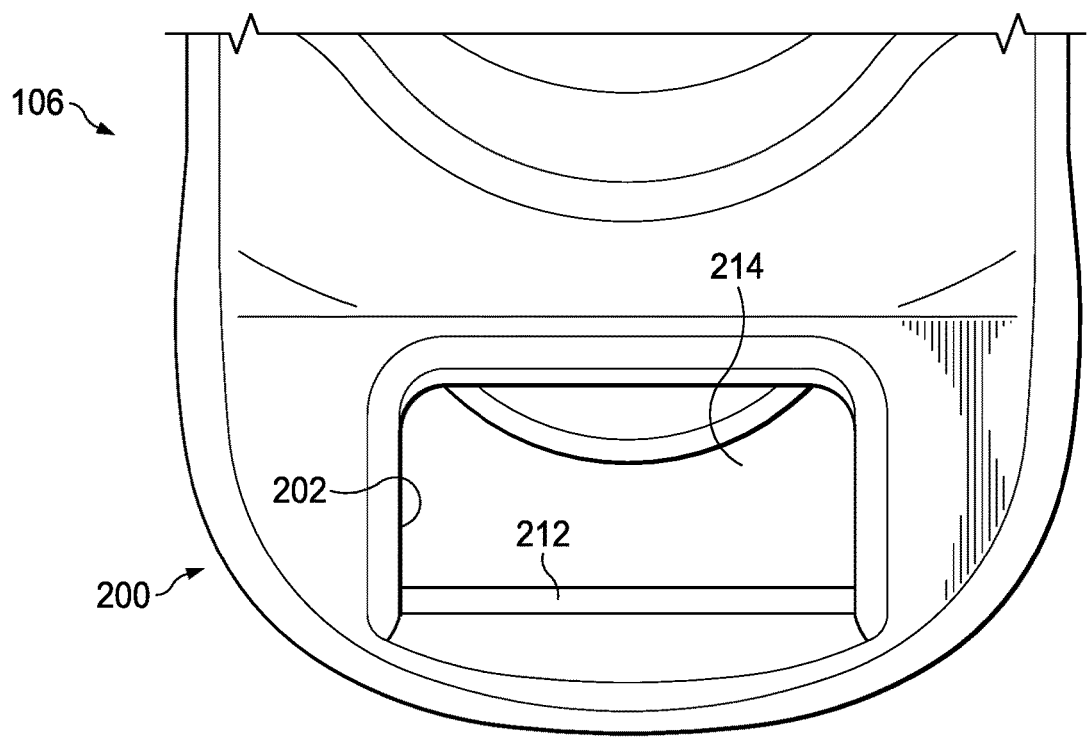
FIG. 6 is a partial front view of the nacelle of FIG. 3.

Referring now to FIGS. 4-6, IAMS 200 is shown with the inlet door 212 open to allow air to flow into the IAMS 200 via the primary inlet 202. IAMS 200 further comprises a continuous duct 214 that receives the air entering primary inlet 202 and delivers the air to an inlet of engine 112. Duct 214 is provided with apertures 216 separated by vanes 218. Vanes 218 are configured not only to encourage direction of air from the primary inlet 202 to the engine 112 inlet but also to encourage direction of air entering via the secondary inlet 206 toward the engine 112 inlet. In this embodiment, the vanes 218 are fixed. However, in alternative embodiments, vanes can be provided that can rotate generally along a longitudinal length to vary an angle of incidence relative to air entering through apertures 216. Alternatively, vanes can be provided that can be moved to completely or partially close one or more of apertures 216. In alternative embodiments, apertures and vanes of different shapes and sizes can be provided that provide substantially similar direction of incoming air. In some embodiments, vanes can be provided that comprise a spiral curvature to more actively guide a direction of the airflow. Generally, IAMS 200 can provide fast fresh air to the engine 112 while also providing a path through apertures 216 for air to reach the engine 112 inlet when air is received through the secondary inlets 206. In alternative embodiments, an IAMS substantially similar to IAMS 200 can be provided that comprises no inlet door 212. In some circumstances during forward flight in the airplane mode or an intermediate mode, the ram air provided to the primary inlet 202 may be excessive. Accordingly, in some embodiments, apertures 216 and vanes 218 are sized so that excess ram air is naturally rejected at the primary inlet 202 so that while the engine is receiving the amount of air needed, the excess air is prevented from entering the primary inlet 202. This air rejection at the primary inlet 202 behaves much like a funnel being overfilled with fluid so that excess fluid spills out of the funnel. Spilling the excess air at the primary inlet 202 can be desirable because it averts a need to dump air out of the sides or back of the IAMS 200 which is generally less aerodynamically efficient. In some cases, even though the inlet door 212 is open or partially open, some air may be provided to the duct 214 via secondary inlets 206. In some embodiments, the inlet door 212 and/or vanes 218 can be associated with active or powered actuators configured to selectively move the components while in other embodiments, the inlet door 212 and/or vanes 218 can be provided with passive movement mechanisms, such as, but not limited to, spring mechanisms.

Figure 7:
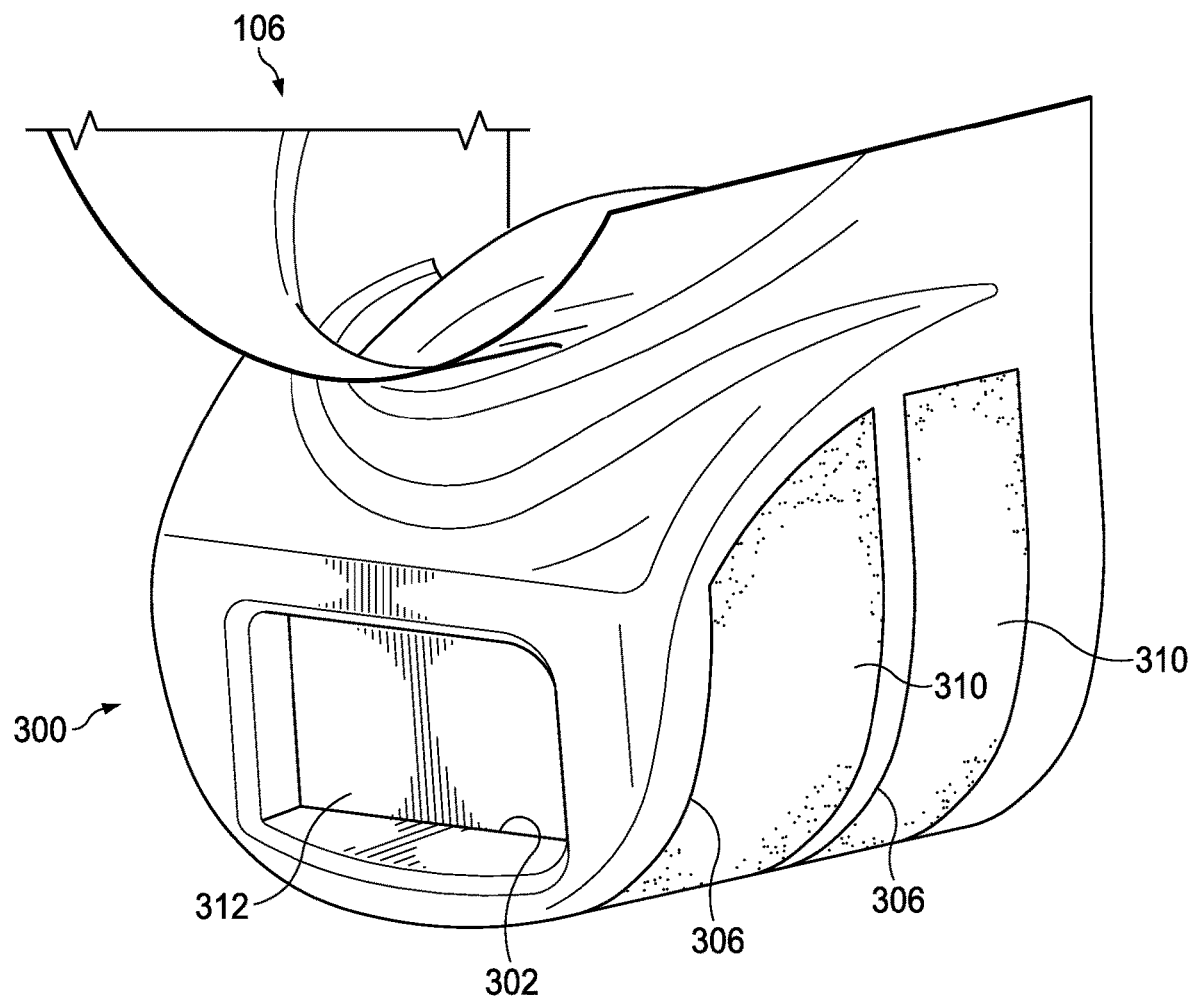
FIG. 7 is an oblique view of an IAMS according to another embodiment of this disclosure.
Figure 8:
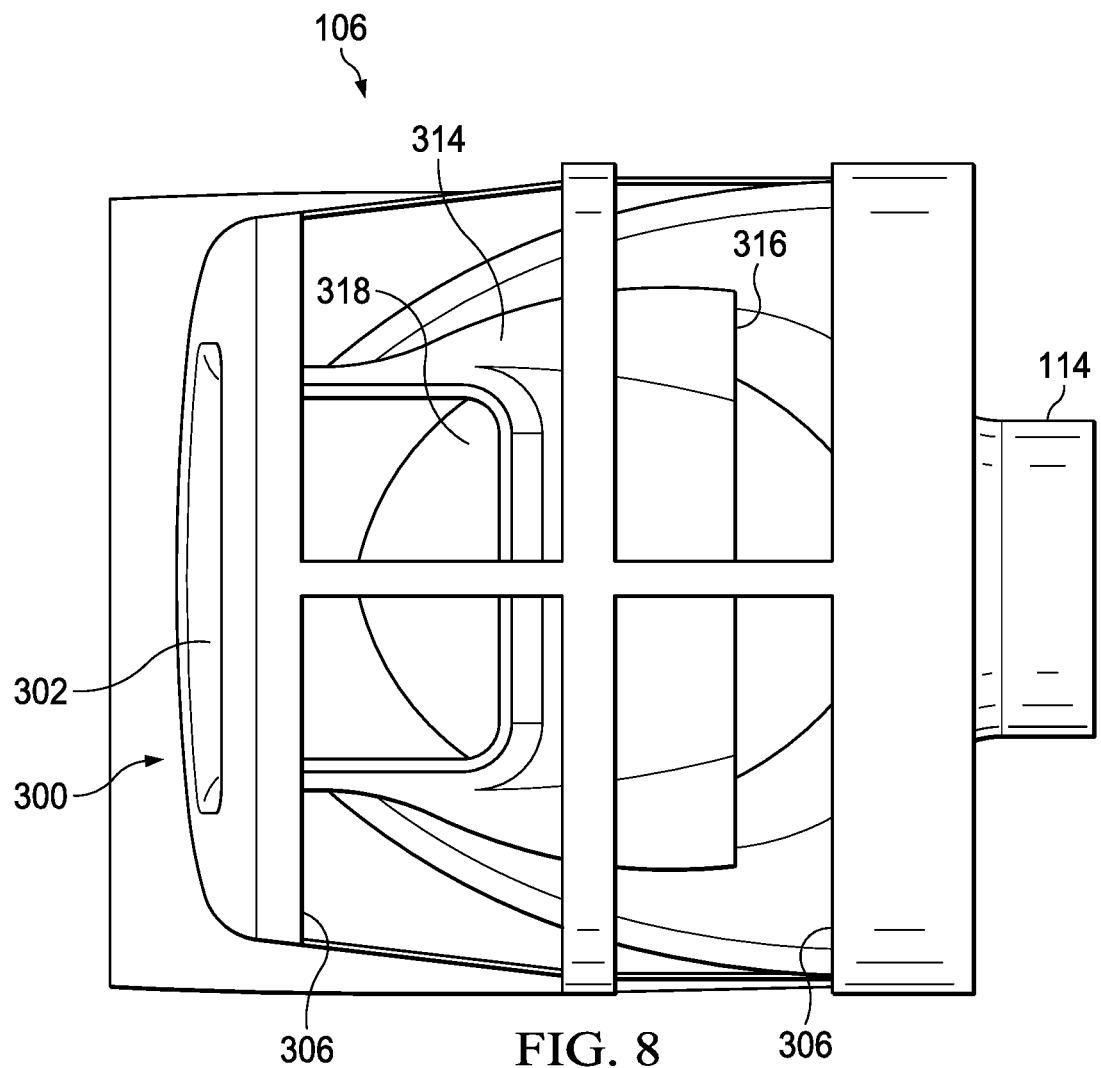
FIG. 8 is a bottom view of the IAMS of FIG. 7.
Figure 9:
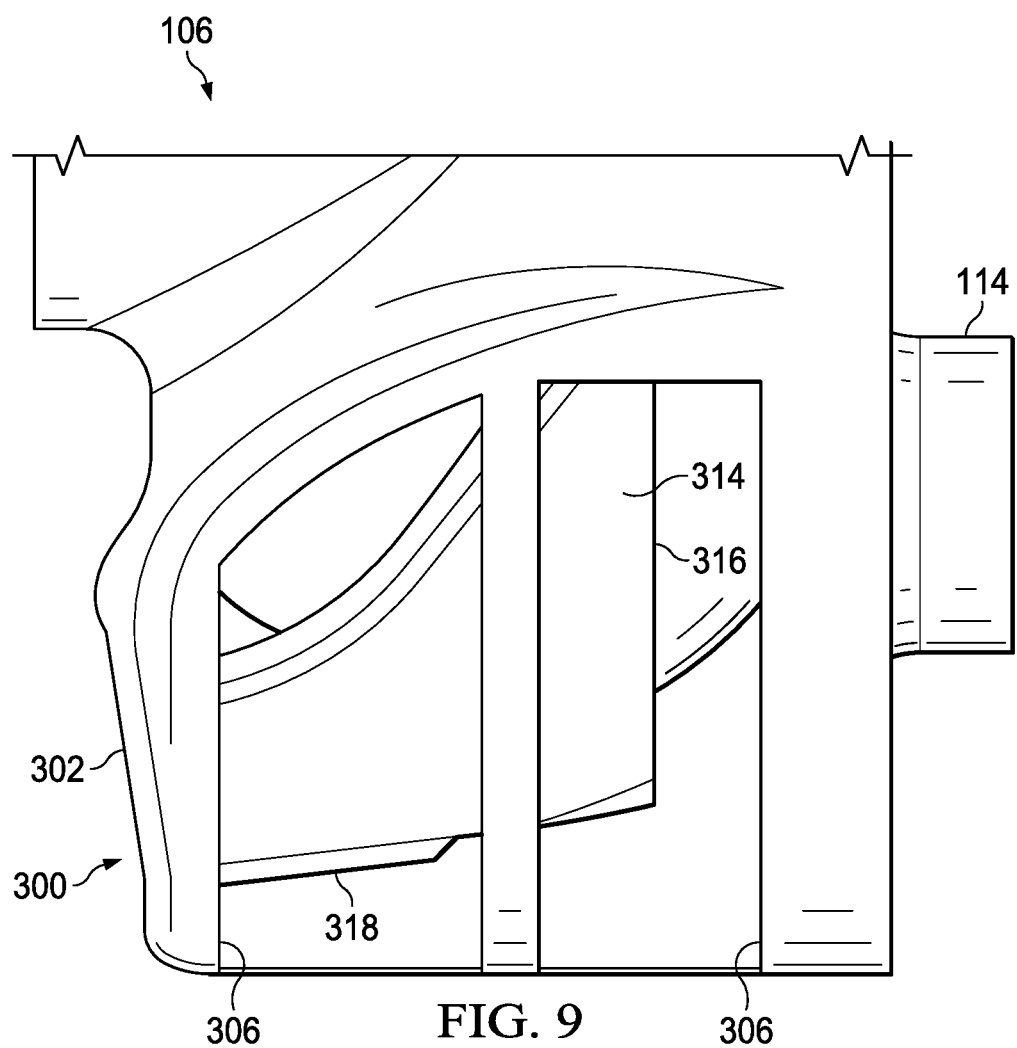
FIG. 9 is a side view of the IAMS of FIG. 7.
Figure 10:
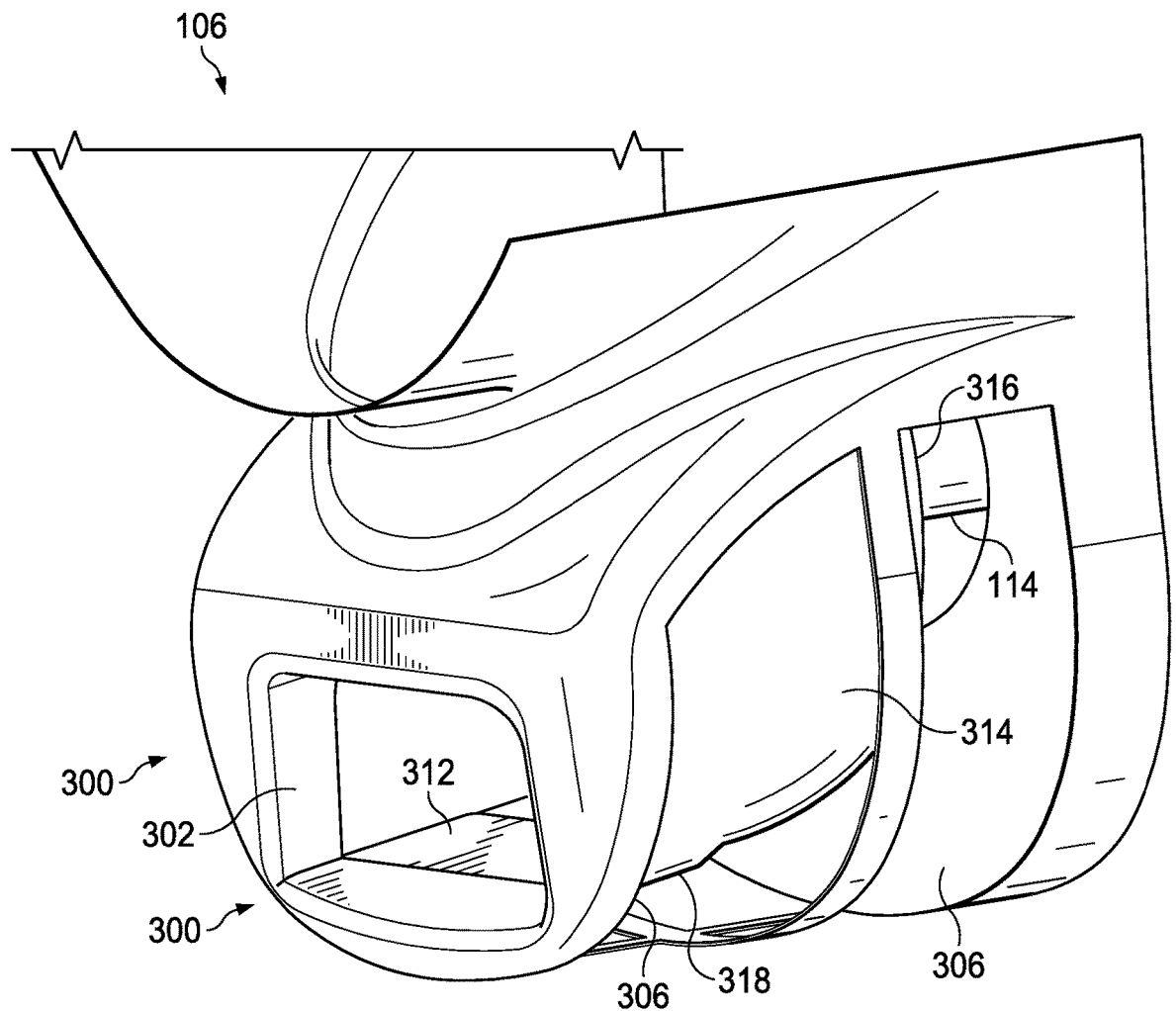
FIG. 10 is another oblique view of the IAMS of FIG. 7.
Figure 11:
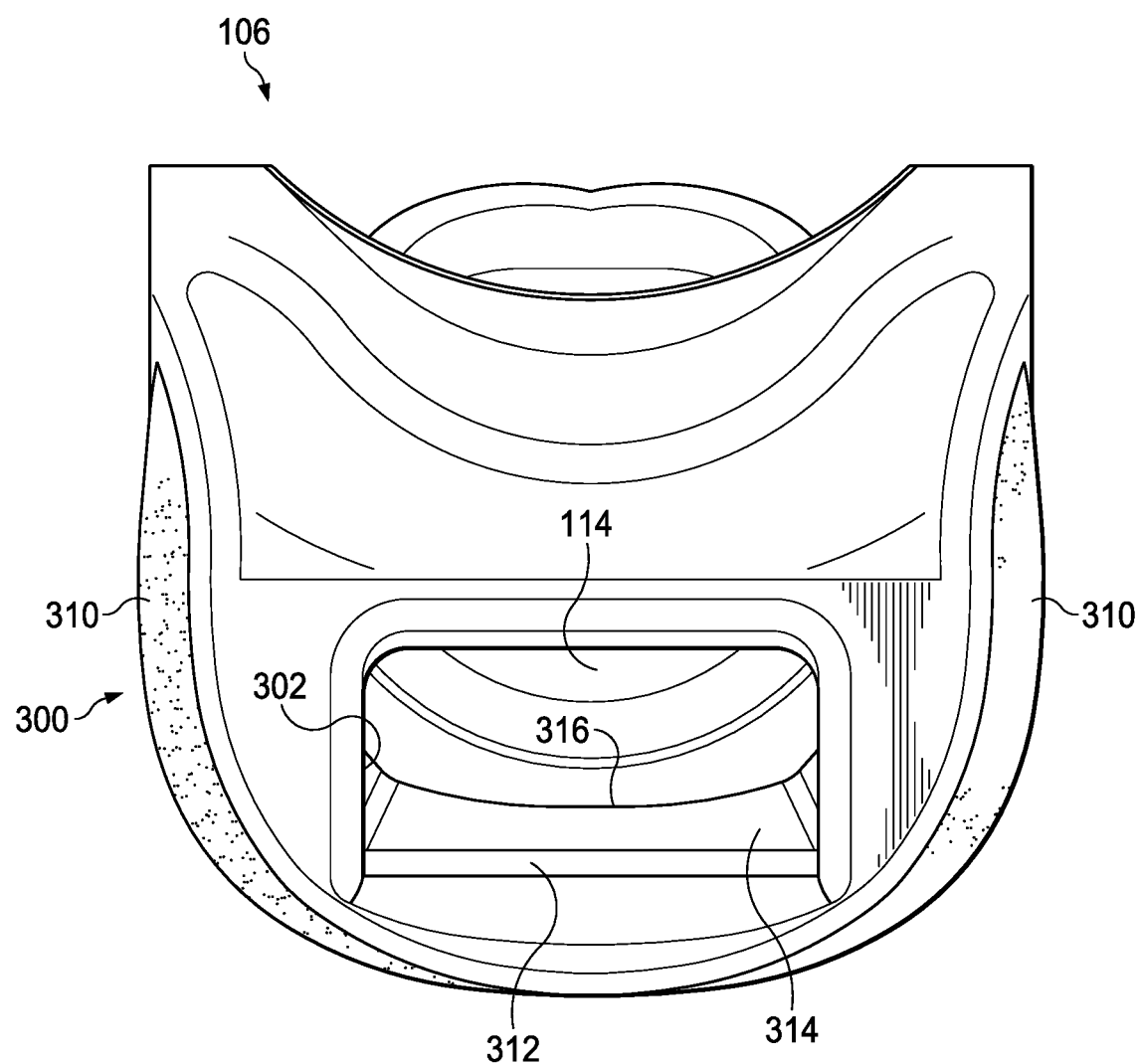
FIG. 11 is a front view of the IAMS of FIG. 7.

Referring now to FIGS. 7-11, an alternative embodiment of an IAMS 300 is shown. The IAMS 300 can be used in place of IAMS 200 to manage air provided to engine 112. FIG. 7 comprises a primary inlet 302 for providing a primary flowpath, a secondary inlet 306 for providing a secondary flowpath, filters 310, an inlet door 312, and a truncated duct 314. FIG. 7 shows IAMS 300 with the inlet door 312 closed and with filters 310 installed. FIG. 8 shows IAMS 300 with filters 310 removed to allow viewing of the interior of IAMS 300. FIGS. 9-11 show IAMS 300 with the inlet door 312 open and with the filters 310 removed in FIGS. 9 and 10 to allow viewing of the interior of IAMS 300. As shown in FIGS. 8-10, a downstream end 316 of the truncated duct 314 does not extend all the way to an inlet 114 of the engine 112. Instead, the duct 314 generally guides air from the primary inlet 302 toward the inlet 114 without a continuous connection between the two. However, by providing the duct 314 an upstream injection aperture 318, the downstream end 316 can be located closer to the engine inlet 114 as compared to a distance allowable when there is no injection aperture 318. In alternative embodiments, an upstream injection aperture can be provided that is large enough to eliminate the need for a truncated duct and a duct can be provided that continuous connects the engine inlet 114 to the primary inlet 302.

In this embodiment, the inlet door 312 is hinged generally along a side of the inlet door 312 so that the inlet door 312 can be moved to a closed position that seals the primary inlet 302 and opens the injection aperture 318, an open position that opens the primary inlet 302 and closes the injection aperture 318, and positions therebetween. In some cases, the inlet door 312 can be spring biased to move in response to desired air pressures while in other cases, the inlet door 312 can be actively controlled using an actuator. In an alternative embodiment, delta air pressure sensors can be utilized to control a position of the inlet door 312 as a function of sensed air pressures at one or more locations relative to the IAMS 300. In some cases, such an actively controlled inlet door can be pivoted along an axis other than along a bottom of the inlet door so that the inlet door is moved like a butterfly valve, although in such an embodiment pressure regulation is not achieved by closing the injection aperture 318. In some cases, one or more of the features of the IAMS 300 can be combined with one or more features of the IAMS 200. More specifically, in an alternative embodiment, an IAMS can be provided that comprises an injection aperture 318, apertures 216, and vanes 218, combined with one or more of the door and/or actuation methods described above.

Figure 12:
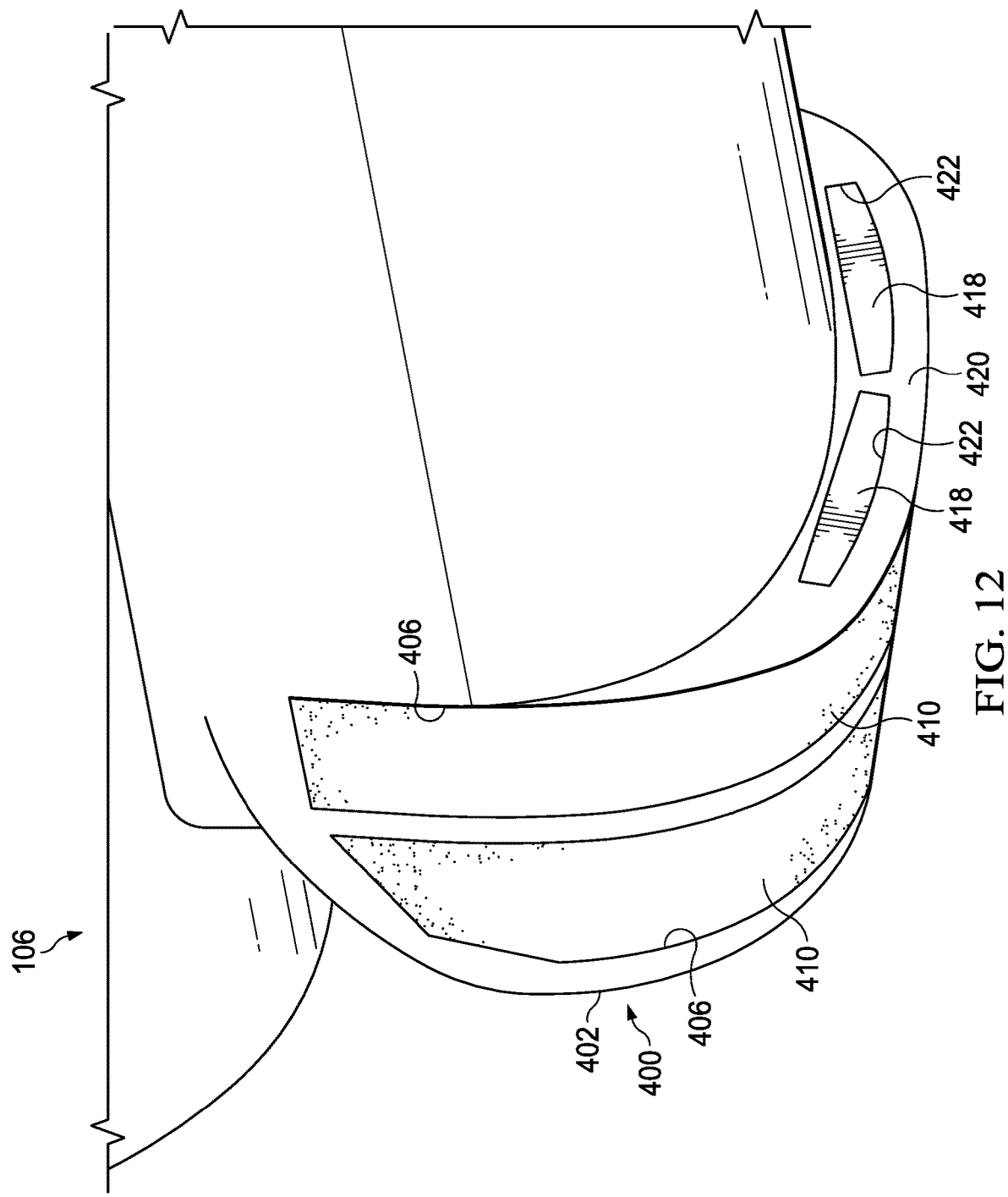
FIG. 12 is an oblique view of an IAMS according to another embodiment of this disclosure.
Figure 13:
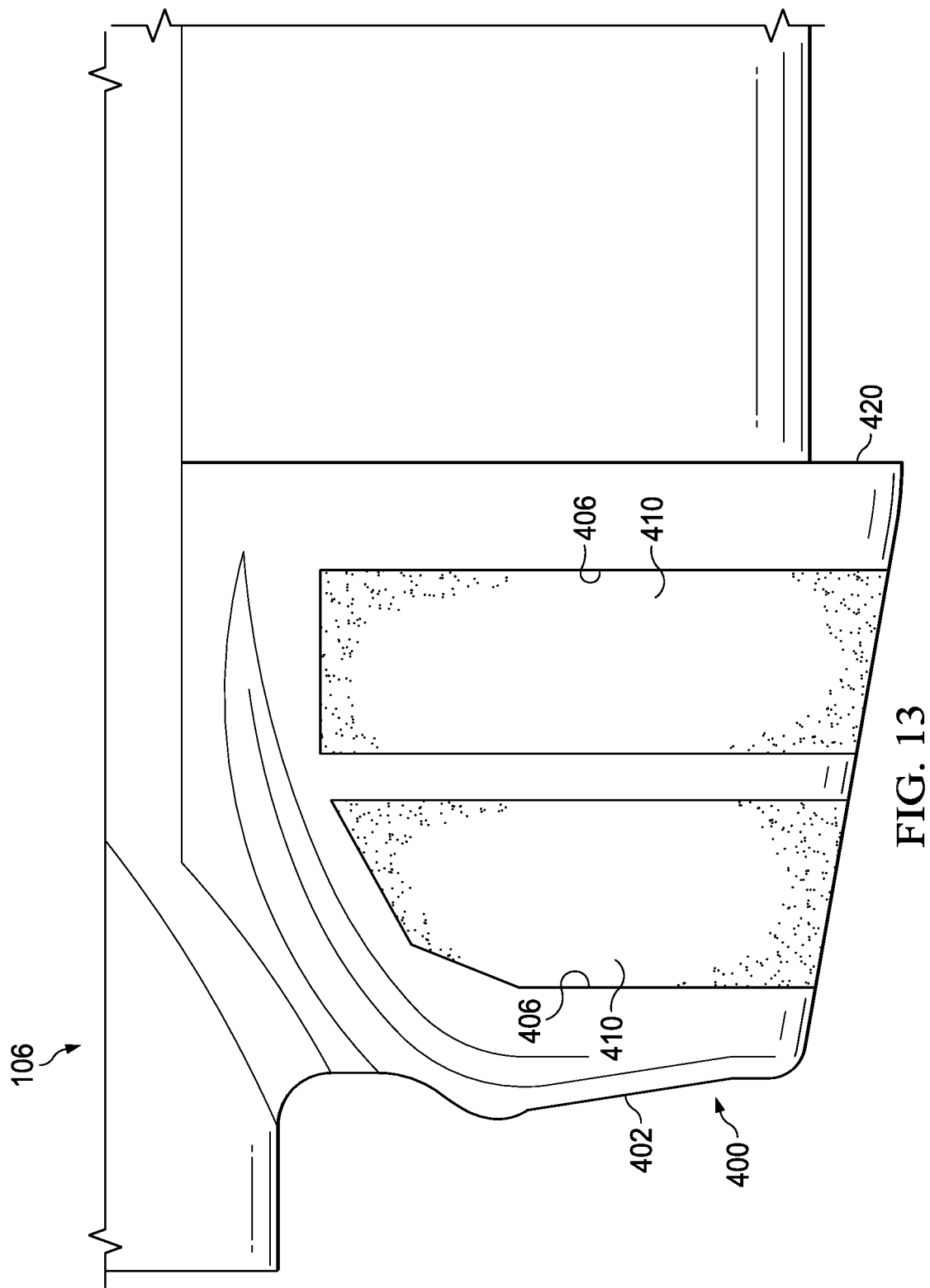
FIG. 13 is a side view of the IAMS of FIG. 12.

Referring now to FIGS. 12 and 13, an alternative embodiment of an IAMS 400 is shown. IAMS 400 is different from each of IAMS 200, 300 in that regulation of air flow and air pressure provided to the engine inlet 114 is not managed by selectively preventing excess ram air from entering the IAMS 400, but rather, IAMS 400 allows excess ram air to be ejected out of a downstream end of the IAMS 400. More specifically, IAMS 400 comprises a primary inlet 402, a secondary inlet 406, filters 410, an inlet door such, a truncated duct substantially similar to truncated duct 314 (less the injection aperture 318), and at least one dump door 418. In operation, IAMS 400 can close the inlet door to force all air to enter the engine inlet 114 via the secondary inlets 406 and the filters 410. IAMS 400 can also be controlled to at least partially open the inlet door to allow air to be provided to the engine inlet 114 from both the primary inlet 402 and the secondary inlets 406. However, during fast forward flight, an excess amount of ram air may need to be mitigated. In this embodiment, the IAMS 400 comprises a downstream outer profile 420 that extends beyond an outer surface of the immediately downstream portion of the nacelle 106. The outer profile 420 comprise dump apertures 422 configured to allow excess air to be ejected through the dump apertures 422. Movable dump doors 418 are provided to selectively control how much air is allowed to exit the dump apertures 422. Dump doors 418 can be configured to be movable simply between a fully open position and a fully closed position. Alternatively, the dump doors 418 can be controlled to any position between fully open and fully closed. When air is emitted from the dump apertures 422, the air is directed substantially parallel to a freestream and therefore can be relatively drag neutral from an aerodynamic standpoint. The dump doors 418 can be collectively actuated using a single actuator or independently actuated using multiple actuators. The dump doors 418 can be configured to move in any of a sliding, pivoting, or rotating manner. In some embodiments, a position of the dump doors 418 can be controlled as a function of tiltrotor aircraft 100 airspeed, mode of flight, and/or sensed air pressures.

It will be appreciated that use of one or more of the concepts disclosed herein allows selective filtration of air fed to an engine inlet while also allowing management of excess ram air and/or excess air pressure. Further, although the IAMS disclosed here are discussed in association with tiltrotor air vehicles, any other vertical takeoff and landing vehicle that can hover and cruise can benefit from IAMS disclosed herein.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-$ $R_l$), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A rotatable nacelle, comprising:
   an engine inlet configured to receive air; and
   an inlet air management system (IAMS), comprising:
      a primary inlet for providing a portion of a primary flowpath, the primary inlet having inlet bottom ledge surface, the primary inlet configured to selectively allow air to flow into a duct associated with the engine air inlet via the primary inlet, wherein the duct is truncated and not connected to the engine inlet;
      a secondary inlet configured to selectively allow air to flow into the duct associated with the engine air inlet via the secondary inlet, the secondary inlet being configured to receive an air filter;
      an inlet door configured to selectively control airflow through the primary inlet.

2. The rotatable nacelle of claim 1, wherein the inlet door is actively controlled.

3. The rotatable nacelle of claim 1, wherein the inlet door is passively controlled.

4. The rotatable nacelle of claim 1, further comprising:
   a dump aperture associated with a downstream outer profile of the IAMS.

5. The rotatable nacelle of claim 4, further comprising:
   a dump door configured to selectively control airflow through the dump aperture.

6. The rotatable nacelle of claim 5, further comprising:
   an inlet door configured to selectively control airflow through the primary inlet.

7. An aircraft, comprising:
   a fuselage;
   an engine inlet configured to receive air; and
   an inlet air management system (IAMS), comprising:
      a primary inlet for providing a portion of a primary flowpath, the primary inlet having an inlet bottom ledge surface, the primary inlet configured to selectively allow air to flow into a duct associated with the engine air inlet via the primary inlet, wherein the duct is truncated and not connected to the engine inlet;
      a secondary inlet configured to selectively allow air to flow into the duct associated with the engine air inlet via the secondary inlet, the secondary inlet being configured to receive an air filter; and
      an inlet door configured to selectively control airflow through the primary inlet.

8. The aircraft of claim 7, wherein the inlet door is actively controlled.

9. The aircraft of claim 7, wherein the inlet door is passively controlled.

10. The aircraft of claim 7, further comprising:
    a dump aperture associated with a downstream outer profile of the IAMS.

11. The aircraft of claim 10, further comprising:
    a dump door configured to selectively control airflow through the dump aperture.

12. A system, comprising:
    an engine inlet configured to receive air, the engine inlet being open toward a first direction; and
    an inlet air management system (IAMS), the IAMS comprising:
    an outer housing fixed relative to the engine inlet, the outer housing comprising;
    a primary inlet open toward the first direction;
    a secondary inlet;
    a duct disposed in the outer housing, the duct being configured to selectively receive air from the primary inlet and the secondary inlet;
    an inlet door operable between (1) a first position in which the inlet door blocks air from passing into the duct from the secondary inlet while allowing air to pass into the duct from the primary inlet and (2) a second position in which the inlet door blocks air from passing into the duct through the primary inlet while allowing air to pass into the duct through the secondary inlet;
    wherein the duct comprises a downstream end that is offset in the first direction relative to the engine inlet.

13. The system of claim 12, wherein when air enters the duct from the secondary inlet, the air enters the duct through the injection aperture.

14. The system of claim 13, further comprising:
    a filter obstructing passage of air through the secondary inlet.

15. The system of claim 12, wherein the inlet door is shaped complimentarily to a profile of the injection aperture of the duct.

* * * * *